Aug. 2, 1966 J. L. GROVE ET AL 3,263,628
BOGIE SUSPENSION FOR CONVERTIBLE RAILWAY-HIGHWAY VEHICLE
Filed April 1, 1964 5 Sheets-Sheet 1
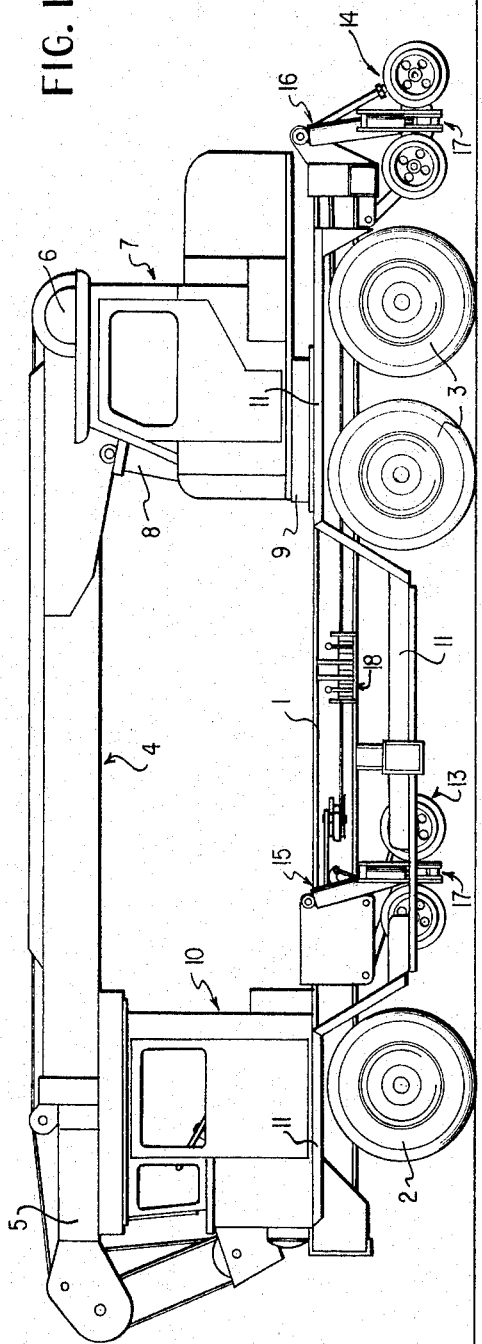
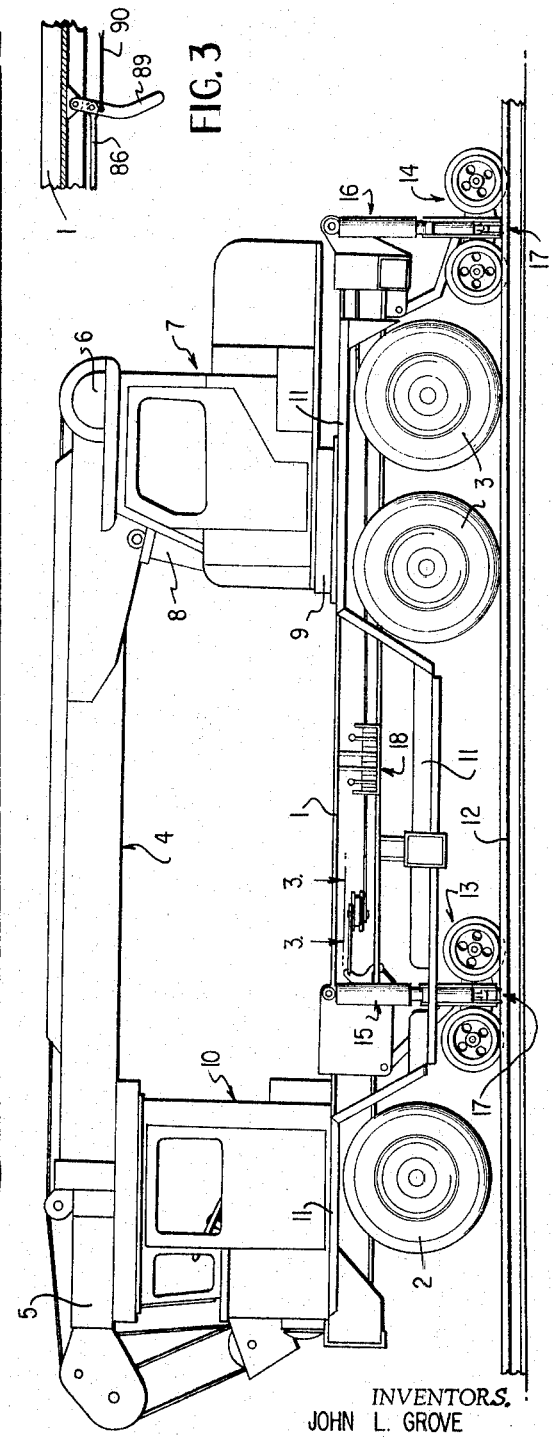
INVENTORS.
JOHN L. GROVE
BENJAMIN A. STEVENS
BY
Rupert J. Brady
ATTORNEY INVENTORS
JOHN L. GROVE
BENJAMIN A. STEVENS
BY
*Rupert J. Brady*
ATTORNEY

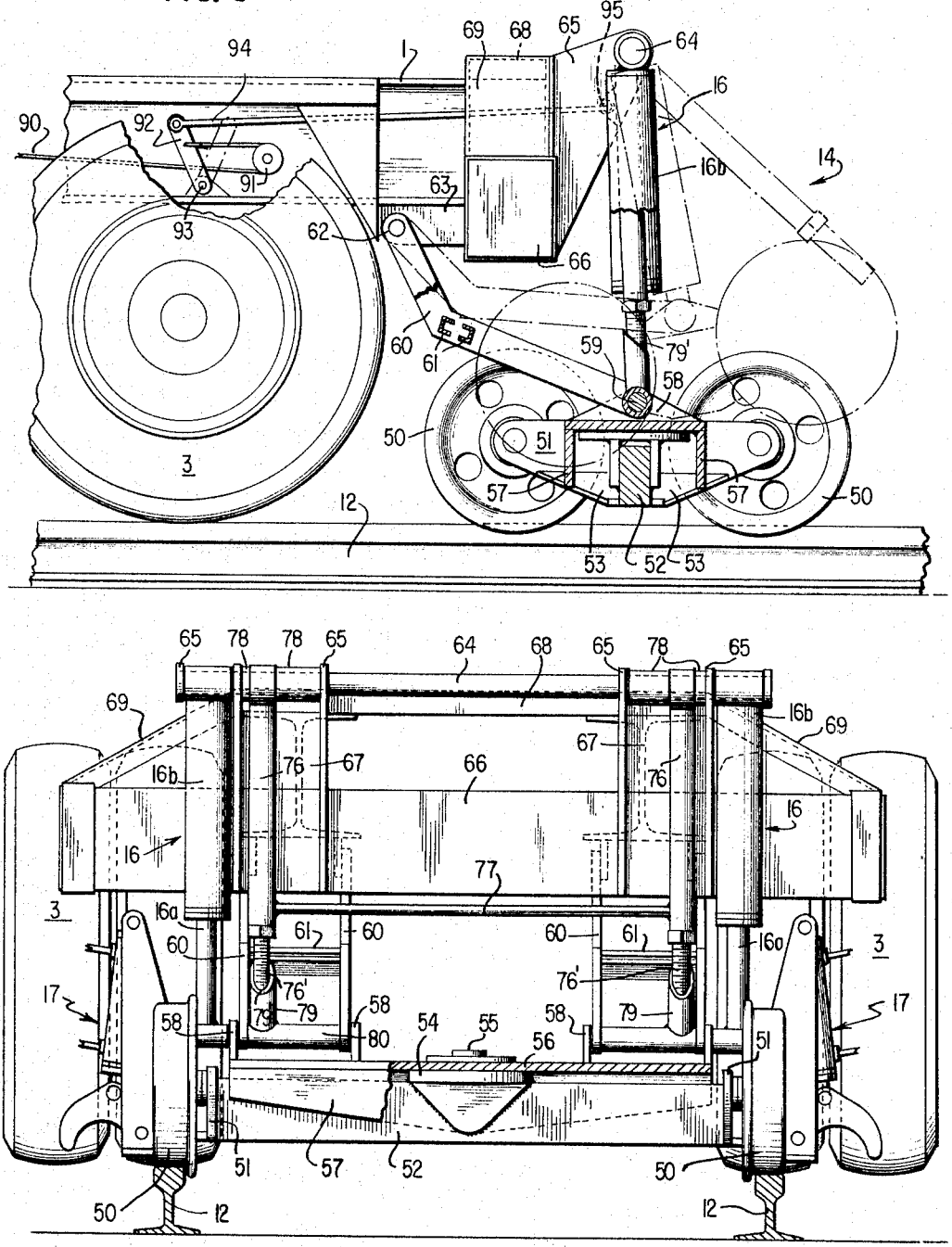

United States Patent Office 3,263,628
Patented August 2, 1966

3,263,628
BOGIE SUSPENSION FOR CONVERTIBLE
RAILWAY-HIGHWAY VEHICLE
John L. Grove, Greencastle, Pa., and Benjamin A. Stevens, Hagerstown, Md., assignors to Grove Manufacturing Company, Shady Grove, Pa., a corporation of Pennsylvania
Filed Apr. 1, 1964, Ser. No. 356,614
10 Claims. (Cl. 105—215)

This invention relates generally to a bogie suspension assembly, and more particularly to a bogie suspension assembly for vehicles adapted to be used selectively on highways and railway tracks.

Heretofore, many types of road-rail vehicles have been devised for selective operation on highways and railway tracks, wherein the vehicle is supported by the conventional pneumatic tires when operating on the highway, and by flanged wheel bogies when operating on railway tracks. These road-rail vehicles have not been entirely satisfactory because of the complicated and ineffective suspension of the bogies carried by the vehicle chassis which causes the vehicle to become easily derailed with the concomitant loss in man hours in returning the vehicle to the tracks.

After considerable research and experimentation, the rail or road type vehicle of the present invention has been devised wherein a pair of flanged wheel bogies are carried by the vehicle frame, for guiding the vehicle while on a railoard track, one bogie being positioned to the rear of the front axle and the other bogie being positioned aft of the rear axle. These bogies are so constructed and arranged to move relative to the vehicle frame whereby they swivel about a vertical axis and rock about a transverse axis, the front bogie being further adapted to oscillate about a longitudinal axis, to thereby stabilize the vehicle while negotiating sharp curves and traveling over undulated terrain. The rail or road vehicle of the present invention also includes a fluid motor system for lowering and raising the bogies to operative and inoperative positions, respectively, and a safety lock assembly for supporting most of the vehicle chassis weight to thereby prevent settling of the vehicle chassis in the event of failure of the fluid motor system while the bogies are in operative position.

An object of the invention is to provide an improved bogie suspension system for rail or road type vehicles.

Another object of the invention is to provide an improved bogies suspension system for rail or road type vehicles wherein one bogie is positioned to the rear of the front axle and another bogie is positioned aft of the rear axle, the bogies being constructed and arranged to provide a three-point suspension when the vehicle is in operative position on a railway track.

Yet another object of the invention is to provide an improved bogie suspension system for rail or road type vehicles wherein a bogie, positioned aft of the vehicle rear axle, is adapted to move relative to the vehicle frame by swiveling about a vertical axis and rocking about a transverse axis.

Still another object of the invention is to provide an improved bogie suspension system for rail or road type vehicles wherein a bogie, positioned to the rear of the vehicle front axle, is adapted to move relative to the vehicle frame by swiveling about a vertical axis, rocking about a transverse axis and oscillating about a longitudinal axis.

Yet still another object of the invention is to provide an improved bogie suspension system for road or rail type vehicles including a fluid motor system for lowering the bogies into operative position on the rails of a railway track, and a safety lock assembly for supporting most of the vehicle chassis weight to prevent settling of the vehicle chassis in the event of failure of the fluid motor system while the bogies are in operative position.

A further object of the invention is to provide an improved bogie suspension system for rail or road type vehicles including a bogie mounted on the vehicle to the rear of the front axle, wherein means are provided for simultaneously lifting the vehicle front axle as the bogie is lowered onto the rails of a railway track.

A still further object of the invention is to provide an improved bogie suspension system for rail or road type vehicles wherein rail clamps are carried by the bogie suspension assembly for locking the bogie wheels to the rails when the vehicle is positioned at a desired working location on a railway track.

With these and other objects in view, which may be incident to my improvements, the invention consists in the parts and combinations to be hereinafter set forth and claimed, with the understanding that the several necessary elements, comprising our invention, may be varied in construction, proportions and arrangements, without departing from the spirit and scope of the appended claims.

In order to make our invention more clearly understood, we have shown in the accompanying drawings, means for carrying the same into practical effect, without limiting the improvements in their useful application to the particular constructions which, for the purpose of explanation, have been made the subject of illustration.

In the drawings:

FIGURE 1 is a side elevational view of the rail or road vehicle of the present invention as the vehicle would appear on the highway;

FIG. 2 is a side elevational view of the rail or road vehicle showing the bogies lowered into operative position for supporting the vehicle on a railway track;

FIG. 3 is a view taken along line 3—3 of FIG. 2;

FIG. 9 is a fragmentary side elevational view of the rear bogie lowered to operative position for travel of the vehicle on a railway track; and FIG. 10 is a rear elevational view of the bogie shown in FIG. 9.

Figure 4:
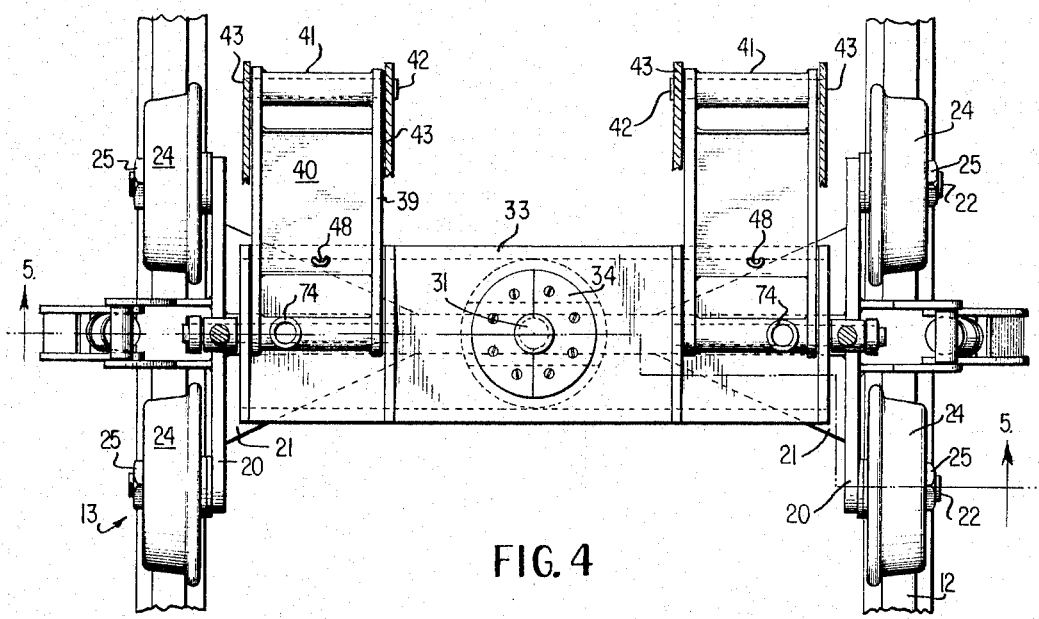
FIG. 4 is a top plan view of the front bogie assembly.

Referring to the drawings, and more particularly to FIGS. 1 and 2 thereof, the rail or road type vehicle of the present invention comprises a longitudinal frame member 1 supported by a pair of front wheels 2 and tandem rear wheels 3, the rear end portion of said frame carrying a conventional hydraulic crane 4 including an extensible boom assembly 5 pivotally mounted as at 6 to a cab assembly 7, fluid motors 8 being provided for actuating the boom in a vertical plane, the cab assembly being pivotally secured to the vehicle frame, as at 9, whereby the cab assembly and associated boom can be rotated in a horizontal plane. The forward end portion of the frame is provided with a cab assembly 10 which houses the conventional controls for the propulsion system for driving the vehicle on the highway or railway, the crane cab assembly also being provided with a remote control system, whereby the travel of the vehicle can be selectively controlled either from the cab assembly 10 or from the crane cab assembly 7. A catwalk 11 is also carried by the frame to facilitate access to the cab assemblies 7 and 10 as well as other components of the vehicle. To accommodate the vehicle for use on a railway track 12, a pair of bogie assemblies 13, 14 are carried by the frame 1, behind the front wheel 2 and rear wheels 3, respectively; the bogies 13, 14 being adapted to be raised (FIG. 1) and lowered (FIG. 2) by means of fluid motors 15, 16, respectively; the bogie assemblies also being provided with fluid motor actuated rail clamps 17, to be described more fully hereinafter. Suitable controls 18 are secured to the vehicle frame for controlling the fluid motor actuated bogies, rail clamps and other fluid actuated accessories carried by the vehicle.

While, for purposes of illustration, the bogie suspension system of the present invention is shown for use on crane type vehicles, it should be understood that it is within the purview of the invention to mount the improved bogie suspension system on other types of rail or road vehicles, such as, freight vehicles, earthworking vehicles, and the like.

Figure 5:
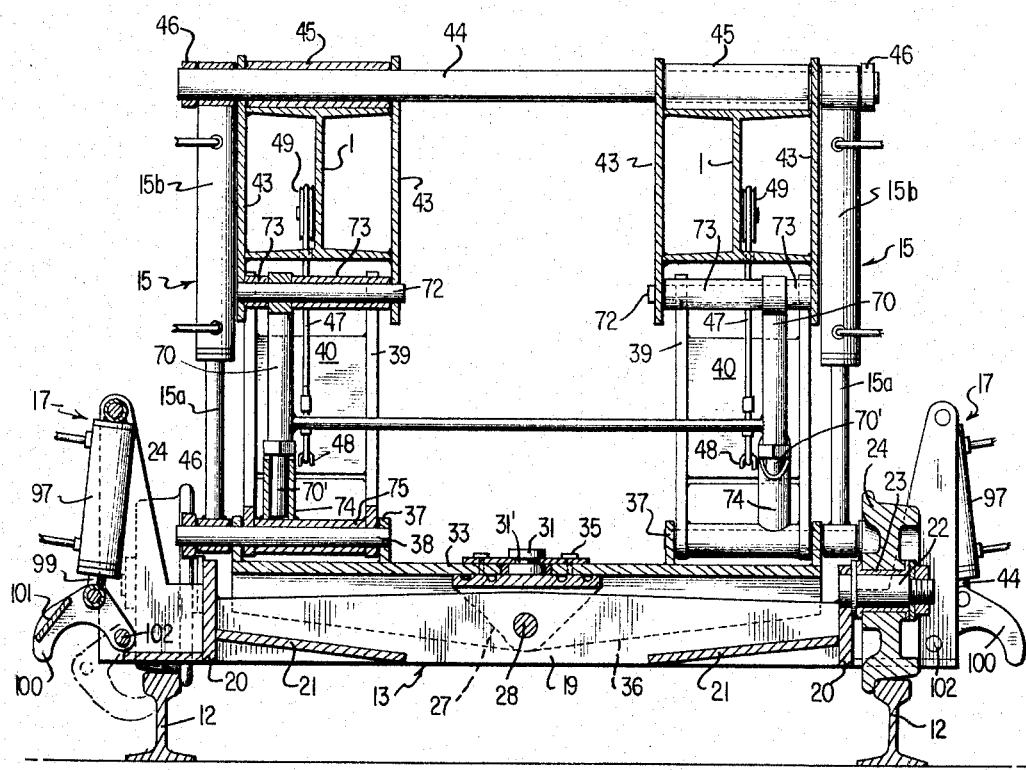
FIG. 5 is a view of the front bogie taken along line 5—5 of FIG. 4.
Figure 6:
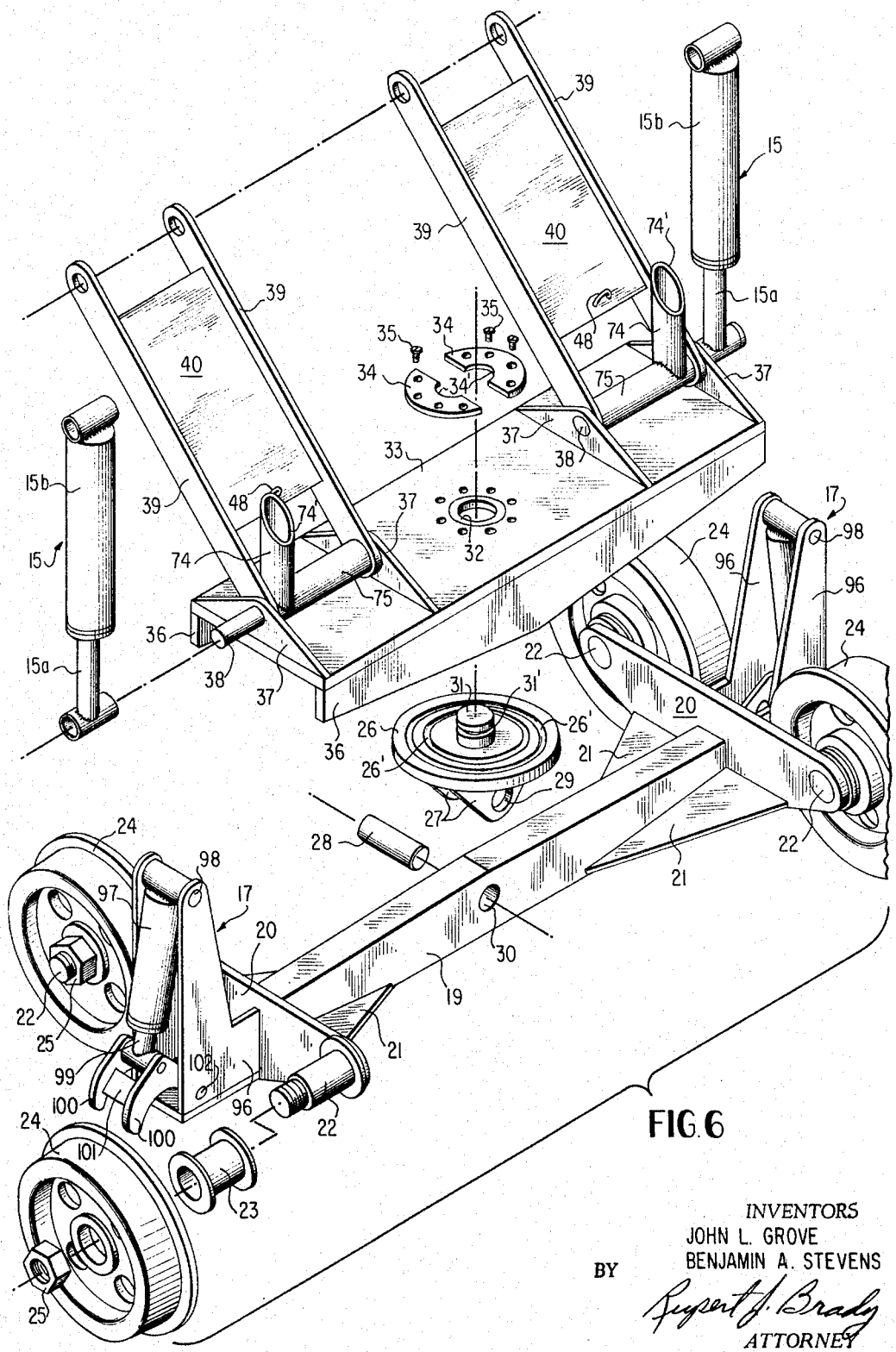
FIG. 6 is an exploded, perspective view of the front bogie.

As will be seen in FIGS. 4, 5 and 6, the front bogie assembly comprises, an axle 19 having a steel plate 20 rigidly secured, as by welding, to each end thereof, and reinforced thereat by means of gussets 21. Each of the plates 20 is provided with a pair of stub shafts 22 having plastic bearings 23 upon which flanged wheels 24 are journaled and secured thereon by suitable lock nuts 25. The plastic bearings are preferably formed from a phenolic material which not only serves as an anti-friction material but also acts as an insulator between the wheels and the stub shafts, to thereby prevent the vehicle from creating a short circuit across the railway track, with the resultant indication on the railroad control boards; however, when using the vehicle on a railroad track the operator will be informed when to clear the track so as not to delay railroad traffic.

A caster plate 26 is pivotally secured to the medial portion of the axle 19 by means of a pair of depending flange members 27 adapted to straddle the axle and held thereon by a pin 28 extending through apertures 29 formed in the flange members which are aligned with an aperture 30 formed in the axle. The upper surface of the caster plate is provided with a vertically extending shaft 31 adapted to be journaled in an aperture 32 formed in a bolster plate 33. A split washer disc 34, having an inner peripheral edge 34′ inserted within an annular recess 31′ formed in the shaft 31, is secured to the bolster plate by means of bolts 35, or other suitable securing means, to thereby hold the caster shaft 31 within the bolster plate aperture 32. The upper surface of the caster plate also is provided with annular grooves 26′ for receiving lubricating fluid to reduce the friction between the caster plate 26 and the bolster plate 33 as the axle 19 and associated caster plate pivot in a horizontal plane relative to the bolster plate, the bolster plate 33 being further provided with a skirt portion 36 which straddles the axle 19 for limiting the turning of the axle beyond a predetermined degree. The upper surface of the bolster plate is provided with a pair of upwardly extending brackets 37 positioned on either end of the bolster plate, each pair of brackets being adapted to pivot about a transversely extending pin 38 carried by the lower ends of a pair of arms 39 which function as radius arms for stabilizing the lateral movement of bolster plate 33. Each pair of arms are interconnected by a reinforcing plate 40 and the upper ends of each of the arms are interconnected by a sleeve 41 (FIG. 4) pivotally mounted on a transversely extending pin 42 secured to a pair of rectangular plates 43 (FIG. 7) rigidly connected to the longitudinally extending frame member 1.

Figure 7:
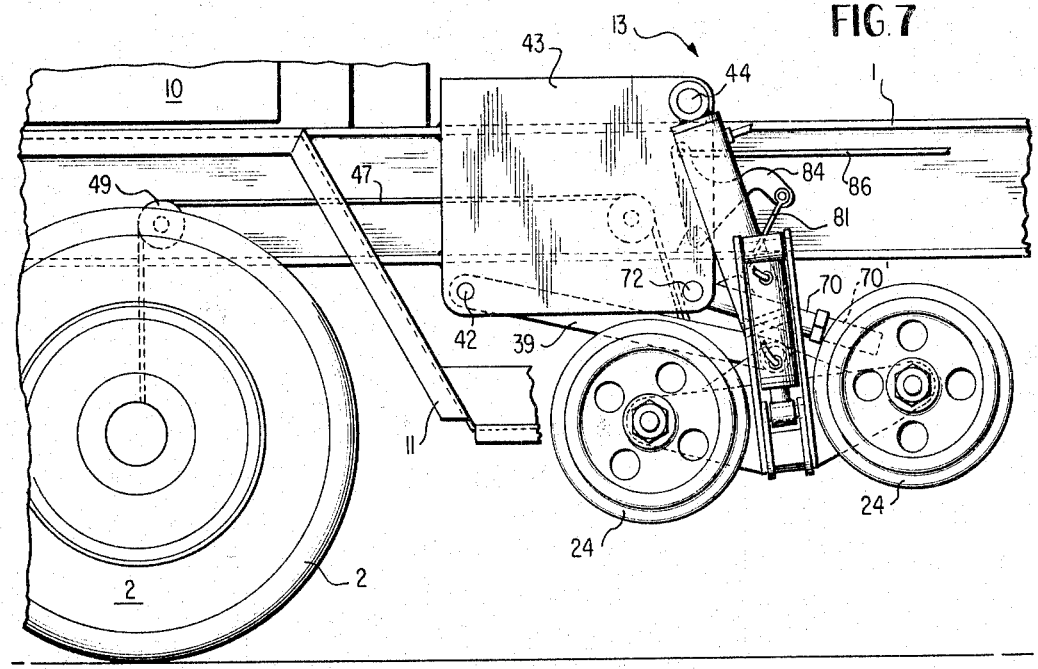
FIG. 7 is an enlarged, fragmentary side elevational view showing the front bogie in elevated position for travel of the vehicle over a highway.

From the description thus far, it will be readily seen that the front bogie axle 19 is adapted to move relative to the vehicle frame by oscillating about a longitudinal axis by means of pin 28, swiveling about a vertical axis by means of shaft 31, and rocking about a transverse axis by means of pins 38. This three-dimensional movement permits the front bogie to freely follow the railway tracks not only when negotiating sharp curves but also when traveling over undulated terrain. As noted hereinabove, the front bogie assembly is adapted to be raised and lowered by means of fluid motors 15, preferably of the hydraulic type, having their piston rods 15a pivotally connected to the pins 38, and their cylinders 15b pivotally connected to a transversely extending shaft 44 (FIG. 5) extending between the longitudinal frame members 1, and mounted thereon by means of sleeve members 45 secured to the upper flange portions of the frame members 1, the shaft 44 extending through the rectangular plates 43 at the corner diagonally opposite from where the arms 39 are pivoted (FIG. 7). Suitable lock nuts 46 are provided on the ends of the shaft 44 and pins 38 for maintaining the fluid motors in proper position thereon.

As will be seen in FIG. 7, when the fluid motors are actuated to elevate the bogie, the piston rods 15 are retracted to lift the bogie, through pin 38, thereby causing the arms 39 to pivot upwardly about pin 42. Since the bolster plate 33 is freely pivoted on the pin 38, the wheels 24 maintain a substantially horizontal position in the elevated position so that when lowered, both wheels simultaneously engage the track.

Figure 8:
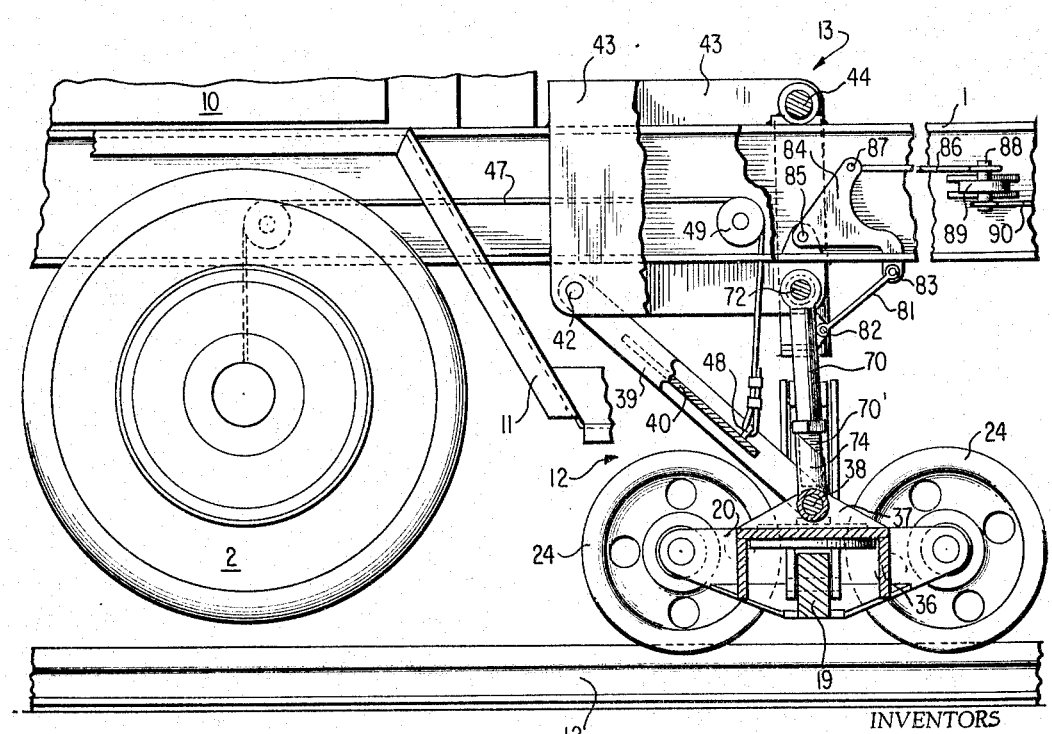
FIG. 8 is an enlarged, fragmentary side elevational view showing the front bogie lowered to operative position for travel of the vehicle on a railway track.

Referring to FIG. 8, in order that the vehicle front wheels 2 may be lifted when the bogie 12 has been lowered to operative position on the railway track, a pair of cables 47 are provided, each having one end connected to the vehicle front axle and the opposite end connected to an eyelet 48 rigidly secured to plate 40, said cable being passed through apertures formed in the lower flanges of the frame members and being reeved around suitable sheaves 49 rotatably mounted on the web portion of said frame members 1. By this construction and arrangement, when the arms 39 and associated reinforcing plates 40 are lowered, the cables 47 are pulled downwardly thus lifting the vehicle axle upwardly, to thereby maintain the axle clear of any obstruction on the track, and to relieve the vehicle front springs from the weight of the unsprung portion of the vehicle.

As will be seen in FIGS. 9 and 10, the rear bogie assembly 14 is similar in construction to the front bogie assembly in that a pair of flanged wheels 50 are rotatably mounted on respective plates 51 secured to each end of an axle 52 having gussets 53. However, the rear bogie assembly differs from the front bogie assembly in that caster plate 54 is rigidly secured, as by welding, to axle 52; whereas in the front boogie assembly, as described hereinabove, the caster plate 26 is pivotally connected to the front axle 19. The caster plate 54 is provided with a shaft 55 which extends upwardly through a bolster plate 56, whereby rear axle 52 is adapted to swivel about a vertical axis defined by shaft 55, the swiveling movement of axle 52 being limited by a skirt member 57 depending from the lower surface of bolster plate 56. The upper surface of bolster plate 56, on either end portion thereof is provided with a pair of brackets 58, each adapted to pivot about a transversely extending pin 59 carried by the lower ends of a pair of arms 60, said arms being reinforced by transversely extending, oppositely disposed, channel members 61. The upper ends of each pair of arms are connected to a transversely extending pin 62 journaled within a depending bracket 63 secured to the lower flange portion of the vehicle longitudinal frame member 1.

By the construction and arrangement of the front and rear bogies, three-dimensional movement is provided when the vehicle is positioned on railway tracks; thus, the vehicle is maintained substantially level when operating on uneven tracks, whereby the chassis frame is prevented from twisting to thereby preclude the derailment of the vehicle.

Each of the fluid motors 16 for raising and lowering the rear bogie assembly 14 comprises, a piston rod 16a pivotally connected to pins 59, and a cylinder 16b pivotally connected to a transversely extending shaft 64 carried by a pair of brackets 65 secured to each end of the vehicle transverse frame member 66, said bracket extending outwardly and upwardly therefrom. Further reinforcement of the bracket 65 is provided by means of a web portion 67 rigidly connected to the brackets and having its lower end portion secured to the vehicle transverse frame members 66 and its upper end portion rigidly secured, as by welding, to a transversely extending channel member 68 carried by the vehicle longitudinal frame member 1, and stabilized thereon by means of diverging struts 69 having their divergent end portions rigidly secured to the outer extremities of the vehicle transverse frame members 66. As will be seen, in dotted lines, in FIG. 9, to elevate the rear bogie, fluid motors 16 are actuated to retract piston rods 16a thereby lifting the bogie through pin 59 and causing arms 60 to pivot upwardly about pin 62. Since bolster plate 56 is freely pivoted on pin 59, wheels 50 maintain a substantially horizontal position, in the same manner as described hereinabove with regard to the front bogie.

One of the important features of the present invention is the provision of a safety lock assembly for each of the front and rear bogies for relieving the weight of the vehicle chassis from the fluid motors when the bogies are in operative position on a railway track, to thereby prevent settling of the vehicle chassis due to a hydraulic failure such as a cylinder rupture, hose breakage, etc., in the fluid motor system. Referring to FIGS. 5, 6 and 8, the safety lock assembly for the front bogie comprises a pair of spaced parallel, depending rods 70 interconnected by a stringer 71, the upper end of each rod being positioned below the vehicle longitudinal frame member and pivotally mounted on a pin 72 carried by the rectangular plates 43, sleeves 73 also being carried by the pins for properly positioning the rods 70 thereon. The lower end of each of the rods is provided with a stud 70' adjustably mounted therein and adapted to be inserted within a socket defined by a tubular member 74 secured to a sleeve 75 mounted concentrically with pin 38, said sleeve being rigidly secured at its opposite end to arms 39. The upper end portion 74' of each tubular member is cut on the bias to facilitate the insertion of the stud 70' therein when the bogie is lowered into operative position.

As will be seen in FIGS. 9 and 10, the safety lock assembly for the rear bogie comprises, a pair of spaced, parallel depending rods 76, interconnected by a stringer 77, the upper end of each rod being positioned above the vehicle longitudinal frame member and pivotally mounted on shaft 64, the rod being positioned on said shaft by means of sleeves 78 secured to brackets 65. The lower end of each rod is provided with a stud 76' adjustably mounted therein and adapted to be inserted within a socket defined by a tubular member 79 secured to a sleeve 80 mounted concentrically with respect to pin 59 and rigidly secured at its opposite ends to arms 60, the upper end portion 79 of each tubular member being cut on the bias to facilitate the insertion of stud 76' therein when the bogie is lowered into operative position.

To properly set the front and rear safety lock assemblies, the bogies are first lowered on the rails by means of fluid motors 15, 16 as described hereinabove, wherein the respective piston rods are extended to their outer limits to allow the studs on the ends of the rods to fall freely within their respective sockets. The piston rods are then retracted until the ends of the studs abut the bottoms of the sockets thereby preventing the bogies from being raised any higher. By this construction and arrangement, most of the vehicle chassis weight is placed on the lock assemblies and by adjusting the length of the rear safety locks by means of studs 76', the weight of the vehicle chassis supported by the vehicle tires on the rails can thereby be varied to obtain maximum traction between the rear tires and the rails.

When elevating the front and rear bogie assemblies, it is necessary to first remove the respective lock assemblies from the sockets; to accomplish this, fluid motors 15 and 16 are actuated to extend the respective piston rods to their outer limits, thereby allowing the safety lock assembly rods to be removed from their respective sockets; the piston rods of the fluid motors are then retracted to lift the front and rear bogie assemblies to their elevated position, whereby the weight of the vehicle is once again supported by the front and rear tires. In order to simultaneously remove the front and rear lock rods from their respective sockets, as will be seen in FIGS. 7, 8 and 9, the front lock assembly is provided with a rod 81 having one end pivotally connected as at 82 to one of the rods 70, the opposite end of rod 81 being pivotally connected as at 83 to a bell crank lever 84 pivotally connected as at 85 to the lower flange of the vehicle longitudinal frame member 1, the lower flange of frame member 1 having an opening for allowing the lower arm of the bell crank lever to pass therethrough. The upper arm of bell crank lever 84 has one end of a rod 86 pivotally secured thereto as at 87, the opposite end of the rod being pivotally connected to a pin 88 carried by a hand lever 89 pivotally connected to the vehicle longitudinal frame member 1. (FIG. 3.) A cable 90, having one end connected to lever 89, extends rearwardly and is passed around a sheave 91 rotatably mounted on the web portion of the vehicle longitudinal frame member 1. The opposite end of cable 90 is connected to a link 92 having one end pivotally secured as at 93 to the lower flange of the vehicle longitudinal frame member 1, and the opposite end of the link being pivotally connected to one end of a rod 94 which extends rearwardly and has its opposite end pivotally connected to one of the rods 76 as at 95.

By the construction and arrangement of the safety lock assembly actuating means, when hand lever 89 is moved to the left, as viewed in FIG. 3, rod 86 moves forwardly to cause bell crank lever 84 to pivot in a counterclockwise direction, thereby pulling rod 81 and associated lock rods 70 upwardly, as shown in FIG. 7, while simultaneously, cable 90 pulls link 92 in a clockwise direction about pivot 93, thereby causing rod 94 to move rearwardly to pivot the rear lock rods 76 upwardly as shown in dotted lines in FIG. 9.

As noted hereinabove, each of the bogie assemblies is provided with fluid actuated rail clamps 17 for locking the bogie wheels to the rails and to prevent oscillation of the front axle when the vehicle is positioned at the desired working location on the railway tracks. Only the fluid actuated rail clamps for the front bogie assembly will be described, since they are identical in all respects to the rail clamps for the rear bogie assembly. Referring to FIGS. 5 and 6, rail clamps 17 are carried by the bogie assembly at each end thereof, each clamp comprising, a bracket 96 rigidly secured to plate 20 and extending upwardly and outwardly therefrom. The cylinder 97 of a fluid motor is pivotally connected to the bracket as at 98 and the fluid motor piston rod 99 is pivotally connected to a pair of arcuate-shaped clamping arms 100 interconnected by a reinforcing plate 101, said clamping arms being pivotally connected to the bracket as at 102. As will be seen in FIG. 5, the fluid motors and associated clamping arms are constructed and arranged above and outwardly of the rails 12, whereby when the fluid motors are actuated, the clamping arms 100 pivot counterclockwise to engage the ball of the respective rail; to thereby securely lock the flanged wheels to the rails.

In the operation of the rail or road vehicle, while driving on a highway, the front and rear bogie assemblies will be elevated to the raised position as shown in FIG. 1; to operate on a railway track, the vehicle is driven onto the track in such manner that the front tires and the inboard rear tires of the vehicle are positioned on the upper surface of each rail (FIG. 5). The front and rear bogies and associated safety lock assemblies are then lowered into position as described hereinabove so that the front bogie carries approximately fifty percent of the weight of the vehicle, while the rear bogie carries approximately ten percent of the vehicle weight with the remainder of the vehicle weight being carried by the inboard tires. While traveling on the railway tracks, the vehicle derives its motive power from the rear, inboard dual tires of the vehicle which vehicle is also equipped with a full reversing transmission to give the vehicle equal speeds in both directions. With the bogies in place on the rails, the operator need only control the starting and stopping of the vehicle since the three-point suspension and three-dimensional movement afforded by the bogies allows the flanged wheels to follow the rails and prevent derailment of the vehicle.

While we have shown and described the preferred embodiment of our invention we wish it to be understood that we do not confine ourselves to the precise details of construction herein set forth by way of illustration, as it is apparent that many changes and variations may be made therein, by those skilled in the art, without departing from the spirit of the invention or exceeding the scope of the appended claims.

I claim:

1. In a vehicle having front and rear bogie assemblies carried by the vehicle frame for supporting the vehicle on the rails of a railway track, each bogies assembly comprising, a bolster plate operatively connected to said vehicle frame for rocking movement about an axis extending transversely to the longitudinal axis of said vehicle, axle means having at least one flanged wheel rotatably mounted on each end thereof, and a caster plate carried by said axle means and having a vertically extending shaft journaled within said bolster plate, whereby the caster plate and associated axle means are adapted to swivel in a horizontal plane relative to said bolster plate, the front bogie axle means being pivotally connected to said caster plate for oscillatory movement about an axis parallel to the longitudinal axis of said vehicle, the rear bogie axle means being rigidly connected to its respective caster plate, whereby the bogie assemblies provide a three-dimensional movement allowing the bogie flanged wheels to follow the rails to thereby prevent derailment of the vehicle.

2. In a convertible railway-highway type vehicle of the character described having a chassis frame and running gear including front and rear axles having wheels associated therewith, the improvement comprising, front and rear bogie assemblies carried by the vehicle frame rearwardly of the vehicle front and rear axles, respectively, for supporting the vehicle on the rails of a railway track, each bogies assembly comprising, a bolster plate operatively connected to said vehicle frame for rocking movement about an axis extending transversely to the longitudinal axis of said vehicle, axle means having at least one flanged wheel rotatably mounted on each end thereof, and a caster plate carried by the axle and having a vertically extending shaft journaled within said bolster plate, whereby the caster plate and associated axle are adapted to swivel in a horizontal plane relative to said bolster plate; the front bogie axle being pivotally connected to its respective caster plate for oscillatory movement about an axis parallel to the longitudinal axis of said vehicle, the rear bogie axle being rigidly connected to its respective caster plate, whereby when the vehicle is positioned on the rails of a railway track, the bogie assemblies provide a three-dimensional movement allowing the bogie flanged wheels to follow the rails to thereby prevent derailment of the vehicle.

3. In a convertible railway-highway vehicle according to claim 2, wherein means are connected between the vehicle chassis frame and the bogies for raising the bogies for travel of the vehicle on a highway, and for lowering the bogies for travel of the vehicle on a railway track.

4. In a convertible railway-highway type vehicle according to claim 3, wherein the vehicle rear wheels engage the rails of the railway track to provide traction, thereby providing the vehicle with motive power for travel thereof on the railway track.

5. In a convertible railway-highway type vehicle according to claim 3, wherein means are connected between the front bogie assembly and the vehicle front axle, whereby when the front bogies assembly is lowered into operative position on a railway track, the vehicle front axle is simultaneously raised to thereby maintain the axle clear of any obstruction on the track and to relieve the weight of the unsprung portion of the vehicle from the vehicle front springs.

6. In a convertible railway-highway type vehicle according to claim 3, wherein rail clamp means are secured to each of the bogies, whereby the bogie wheels may be locked to the rails to maintain the vehicle at a desired working location on the railway tracks to prevent oscillation of the front bogie axle.

7. In a convertible railway-highway type vehicle according to claim 3, wherein the means for raising and lowering the bogies comprises, a fluid motor system, a safety lock assembly operatively connected between the vehicle frame and each of the front and rear bogies, respectively, whereby the entire weight of the vehicle is relieved from the fluid motor system when the bogies are in operative position on a railway track.

8. In a convertible railway-highway type vehicle according to claim 7, wherein each safety lock assembly comprises, a pair of rods, one end of each rod being pivotally connected to the vehicle chassis frame, and a pair of socket members operatively connected to a respective bolster plate, the opposite end of each rod being adapted to be inserted within a respective socket.

9. In a convertible railway-highway type vehicle according to claim 8, wherein means are carried by the vehicle chassis frame and operatively connected to each of the safety lock assemblies for simultaneously raising said safety lock assemblies to inoperative position.

10. In a convertible railway-highway type vehicle according to claim 8, wherein the vehicle rear wheels are supported by the rails to provide motive power for the vehicle when the bogies are in operative position on the railway track, an adjustable stud carried by the opposite ends of the rods of the rear safety lock assembly, whereby the length of the rods can be adjusted to thereby vary the weight of the vehicle chassis supported by the rear wheels of the vehicle to obtain maximum traction between the rear wheels and the rails.

References Cited by the Examiner

UNITED STATES PATENTS

| | | | |
|---|---|---|---|
| 1,512,755 | 10/1924 | Galbraith | 105—215 |
| 1,824,196 | 9/1931 | Cullen et al. | 105—215 |
| 2,781,002 | 2/1957 | Talboys | 105—177 |
| 2,789,516 | 4/1957 | Hursh et al. | 104—12 |
| 2,896,553 | 7/1959 | Whisler | 105—215 |
| 3,019,742 | 2/1962 | Kershaw | 105—215 |

ARTHUR L. LA POINT, *Primary Examiner.*

H. BELTRAN, *Assistant Examiner.*